United States Patent [19]

Takeda et al.

[11] Patent Number: 5,386,670
[45] Date of Patent: Feb. 7, 1995

[54] METHOD FOR MANUFACTURING SYSTEM FLOOR AND FLOOR BASE FOR SYSTEM FLOOR

[75] Inventors: Fumio Takeda; Yoshio Kojima; Yutaka Ishibashi; Isako Tsushima, all of Tokyo; Kenji Sugimoto, Chigasaki; Hideo Tanaka, Kamakura; Hidetoshi Takahashi, Yokohama; Fumio Sumiyoshi, Iruma, all of Japan

[73] Assignee: Kabushiki Kaisha Toshiba, Kawasaki, Japan

[21] Appl. No.: 799,935

[22] Filed: Nov. 29, 1991

[30] Foreign Application Priority Data

Nov. 29, 1990 [JP] Japan ................... 2-333075
Nov. 29, 1990 [JP] Japan ................... 2-333076

[51] Int. Cl.⁶ ............................................. E04B 5/00
[52] U.S. Cl. ............................. 52/126.6; 52/126.7; 52/220.2; 52/391; 52/745.19
[58] Field of Search ............ 52/126.5, 126.6, 126.7, 52/126.1, 309.17, 220.1, 220.2, 220.3, 391, 741.1, 743, 745.19, 392

[56] References Cited

U.S. PATENT DOCUMENTS

| | | | |
|---|---|---|---|
| 3,696,578 | 10/1972 | Swensen et al. | 52/126.6 X |
| 4,074,488 | 2/1978 | Ray, III | 52/126.6 X |
| 4,593,499 | 6/1986 | Kobayashi et al. | 52/126.6 |
| 5,031,369 | 7/1991 | Kobayashi et al. | 52/126.6 |
| 5,057,355 | 10/1991 | Klingelhofer et al. | 52/126.6 X |
| 5,074,085 | 12/1991 | Ueda | 52/126.1 X |
| 5,184,438 | 2/1993 | Takeda et al. | 52/126.5 X |

FOREIGN PATENT DOCUMENTS

| | | |
|---|---|---|
| 0125914 | 11/1984 | European Pat. Off. . |
| 0218108 | 4/1987 | European Pat. Off. . |
| 0367176 | 5/1990 | European Pat. Off. . |
| 0385876 | 9/1990 | European Pat. Off. . |
| 2190936 | 12/1987 | United Kingdom . |

*Primary Examiner*—Carl D. Friedman
*Assistant Examiner*—Robert J. Canfield
*Attorney, Agent, or Firm*—Oblon, Spivak, McClelland, Maier & Neustadt

[57] ABSTRACT

A floor panel having a rectangular floor base integrally with a convex prop in each corner portion and a concave portion on the upper surface of each prop. There is a height adjusting screw with a plate embedded in the concave portion of each prop, variably for adjusting the height of the support position in a predetermined range between a position lower than the upper surface of the prop and a position higher than the upper surface of the prop. A floor panel is supported by each prop of the floor base and has through holes for accessing the height adjusting screw for adjusting the support height at each corner according to the prop. In the method of manufacturing the floor base, a convex portion, which integrally projects to the upper surface side on four corners of a skin, is formed, a concave portion is formed on the lower surface of said convex portion, concrete is packed in the concave portion, thereby forming which is integral to said skin.

13 Claims, 5 Drawing Sheets

METHOD FOR MANUFACTURING SYSTEM FLOOR AND FLOOR BASE FOR SYSTEM FLOOR

BACKGROUND OF THE INVENTION

1. Field of the Invention

The present invention relates to a method for manufacturing a system floor and a floor base for the system floor which are used to provide an underfloor shielding wire such as a power cable and a signal cable for various types of equipment used in an automated office.

2. Description of the Related Art

In a conventional automated office, a system floor which provides an underfloor shielding for wire such as a power cable and a signal cable for various types of equipment is described, for example, in Published Unexamined Japanese Utility Model Application No. 61-76045 which discloses the following structure:

Insertion blocks having specific forms to be engaged with each other are integrally formed on a peripheral portion of a rectangular floor base formed on a base floor. Then, the rectangular floor base is formed on the surface of the base floor as the insertion blocks are coupled with each other.

Moreover, Published Unexamined Japanese Patent Application No. 60-40472 discloses the following structure:

A plurality of props are formed on a lower unit, and an upper unit is mounted to be fixed to the lower unit by these props. Thereby, the upper unit is formed on the surface of the basic floor.

However, in the above-mentioned conventional structure, there are various problems such as construction workability, conformability, and the like. More specifically, in the above-mentioned conventional structure, a bottom plate or a bottom portion of a base member, which is called a base plate, have a flat shape. Due to this, an unstable state is generated if the base member is not formed to be flush with the surface of the base floor, so that conformability to the surface of the base floor is lost. In this case, in order to form the base member flush with the surface of the base floor, a high flat accuracy is required in finishing the surface of the base floor. Therefore, there are problems in the various points such as construction cost, construction period of time, and workability.

Moreover, in the structure in which the floor base is formed on the surface of the base floor as the insertion blocks are coupled to each other, mutual insertion work of the blocks is needed between the adjacent floor bases on each side (four sides). Due to this, it requires much labor and time to carry out the construction working including the above mutual insertion work, and there is a problem in that workability worsens. Moreover, in the structure of the mutual insertion work of the blocks, if the mutual insertion of the blocks is tightened so as to firmly and integrally couple the floor bases to each other, much time is required by the construction work and workability worsens more and more. Furthermore, conformability to the surface of the base floor also worsens. If the mutual insertion of the blocks is loosened, the construction work is made easy. However, the floor bases cannot be firmly and integrally coupled to each other, and stability of the upper floor surface and flatness are lost.

Moreover, in the structure in which the upper unit is mounted to be fixed to the lower unit by the plurality of props, since the lower units are arranged on the surface of the base floor and the upper units are mounted to be fixed thereto, the construction work is relatively easily carried out. However, since the lower units are integrally coupled to each other, the stability of the upper floor surface and flatness are lost.

In order to solve the above problems, Japanese Patent Application No. 1-242835 discloses a floor base having the structure in which the props having the same height are formed on each latticed frame cross section, and support a floor panel at many points, and conformability to the surface of the base floor is good and construction work can be easily carried out.

However, in the above-structured floor base, since the number of the props is integrally formed on the latticed frame, the construction becomes complicated and there are problems in the manufacturing cost and treatment.

SUMMARY OF THE INVENTION

An object of the invention is to provide a floor system having a simple structure with a reduced number of parts, and a flat adjustment is simply and quickly carried out, and durability and conformability are improved.

Another object of the present invention is to provide a method for manufacturing a floor base in which the number of structural parts can be minimized and the floor base can be easily manufactured with reasonable cost.

The system floor of the present invention comprises a rectangular floor base in which each convex prop is integrally formed at each of four corners and a concave portion is formed on the surface of the prop; an adjusting part, which is embedded in the concave portion of each prop and can variably adjust the height of the support position in a predetermined range between a position lower than the upper surface of the prop and a position higher than the upper surface of the prop; and a floor panel, which is supported by each prop of the floor base and has a through hole of a jig adjusting the support position of the height of the adjusting parts in each corner according to the prop. Thereby, the flat adjustment can be easily carried out with the simple structure in which the number of the parts is reduced, and the construction work is easily and quickly carried out.

Moreover, the system floor of the present invention comprises a floor base forming a convex portion integrally projecting to the upper surface side on at least four corners of rectangular synthetic resin sheet, serving as a skin, and packing concrete in the concave portion formed on the lower surface of the convex portion and forming a prop to be integrated with the sheet; and a floor panel engaged with the prop of the floor base and supported thereby. Thereby, there can be provided the floor structure in which the number of the parts can be reduced, the structure is simplified, the construction work can be easily and quickly carried out, the manufacturing cost can be reduced, and durability and conformability are improved.

A manufacturing method of the floor base of the present invention comprises the steps of forming a convex portion integrally projecting to the upper surface side on at least four corners of rectangular synthetic resin sheet, serving as a skin; forming a concave portion on the lower surface of the convex portion; and packing concrete in the concave portion; hardening the concrete; and forming a prop to be integrated with the skin.

Thereby, the number of the structural parts is minimized, the floor can be easily manufactured with the simple structure and reasonable cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be explained with reference to the drawings.

Figure 1:
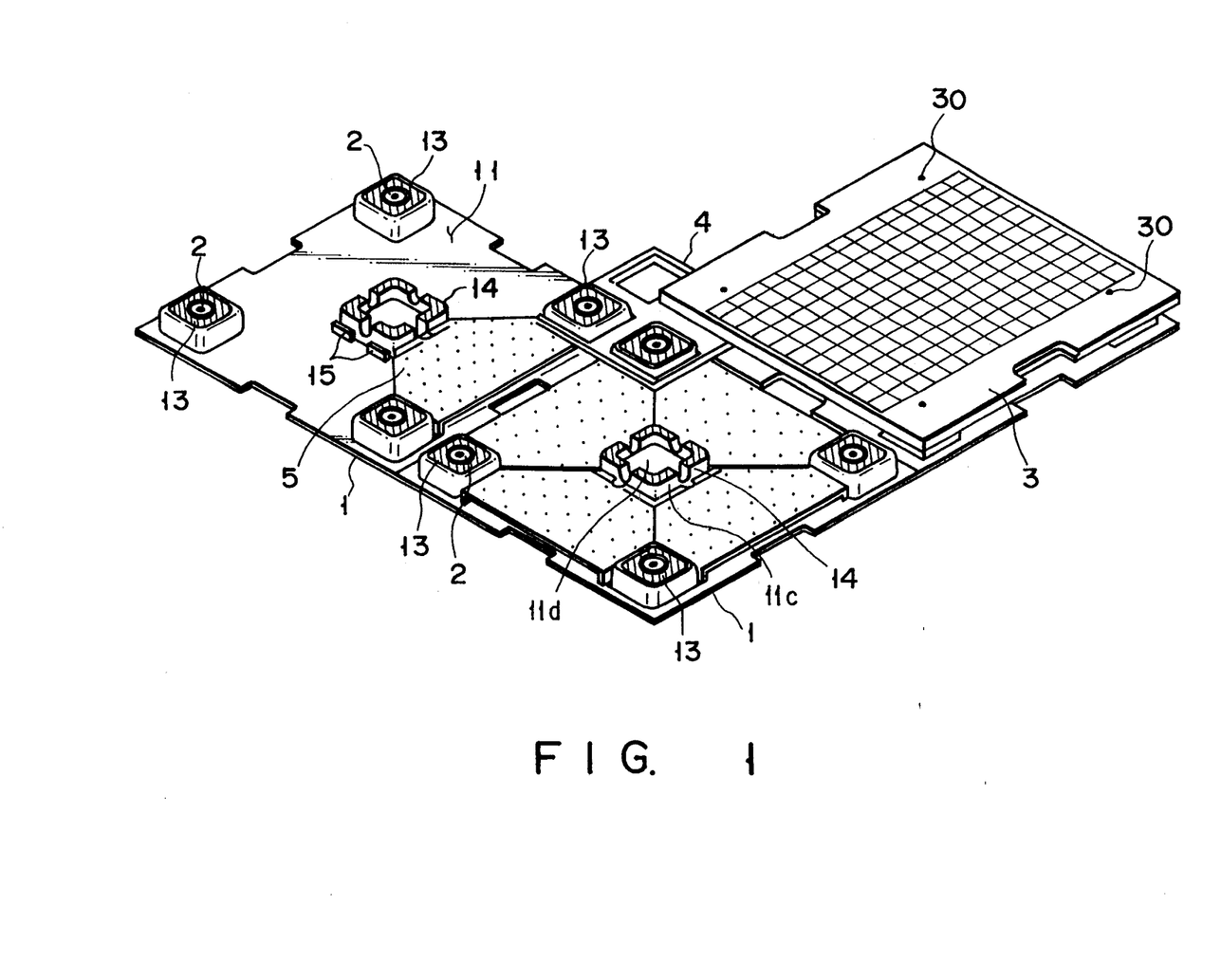
FIG. 1 is an exploded perspective view showing the entire structure of a floor panel according to one embodiment of the system floor of the present invention.
Figure 2:
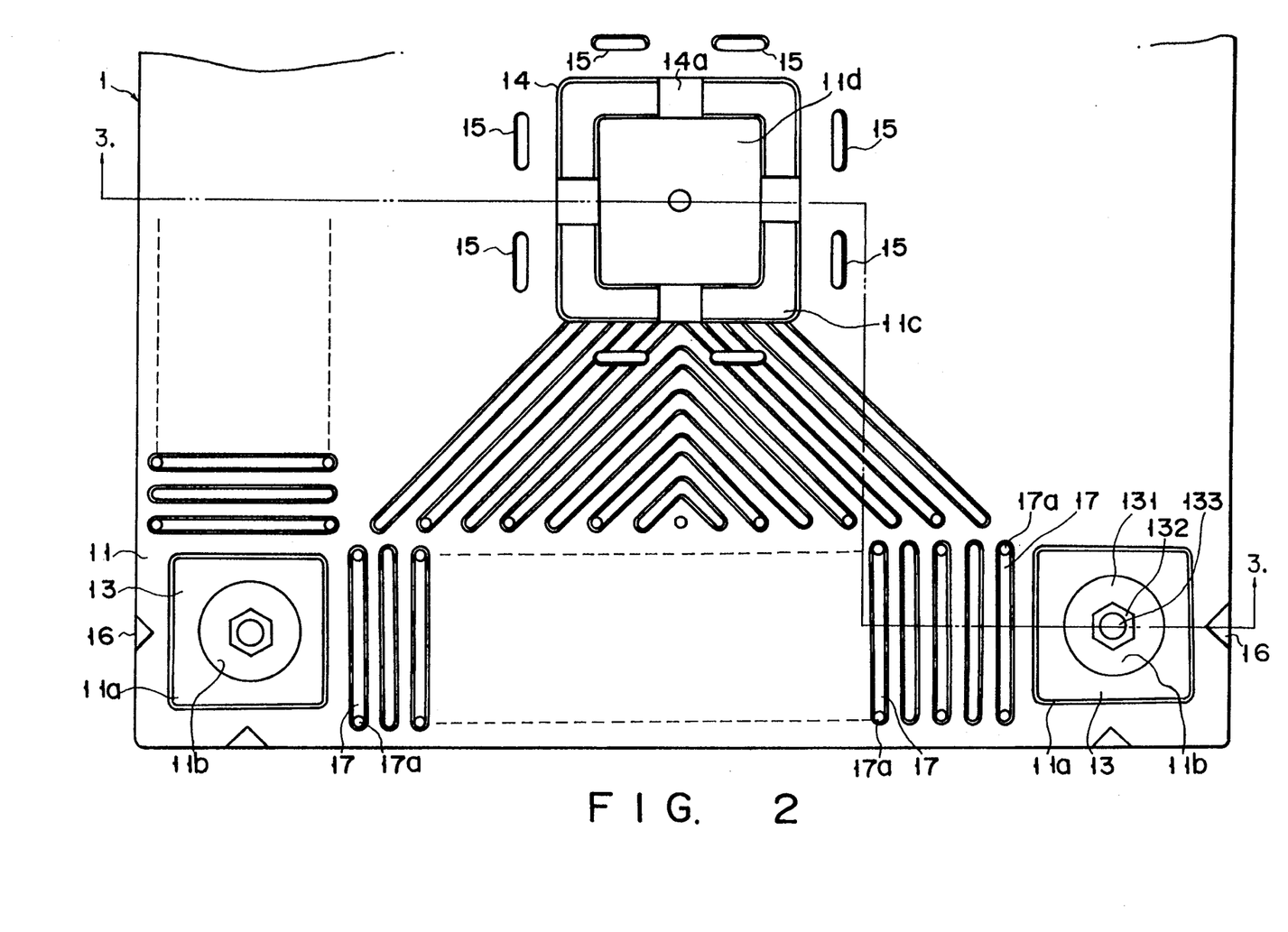
FIG. 2 is a plane view showing the floor base shown in FIG. 1.
Figure 3:
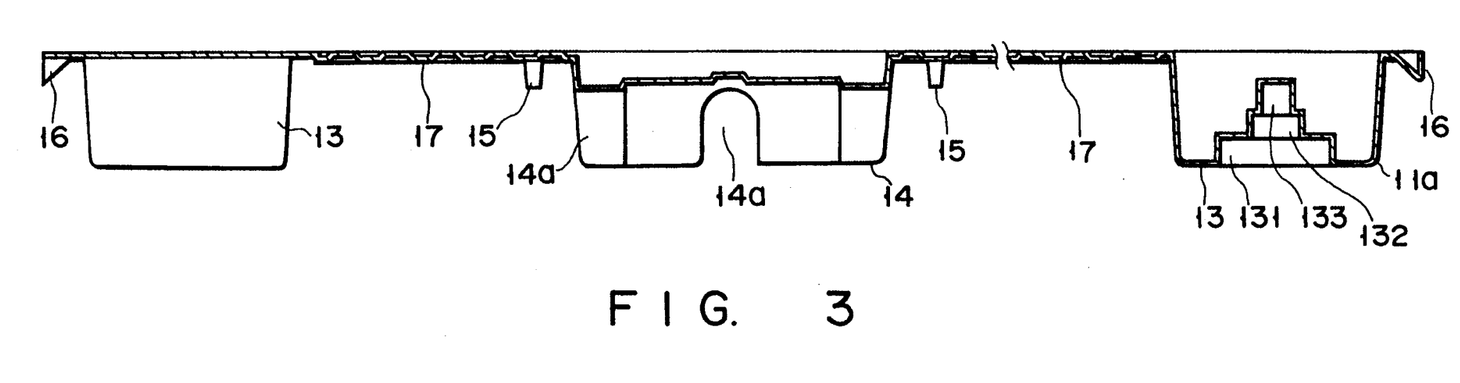
FIG. 3 is a cross sectional view of a skin containing props 13 and auxiliary prop 14 in an upside position before concrete is added thereto.
Figure 5:
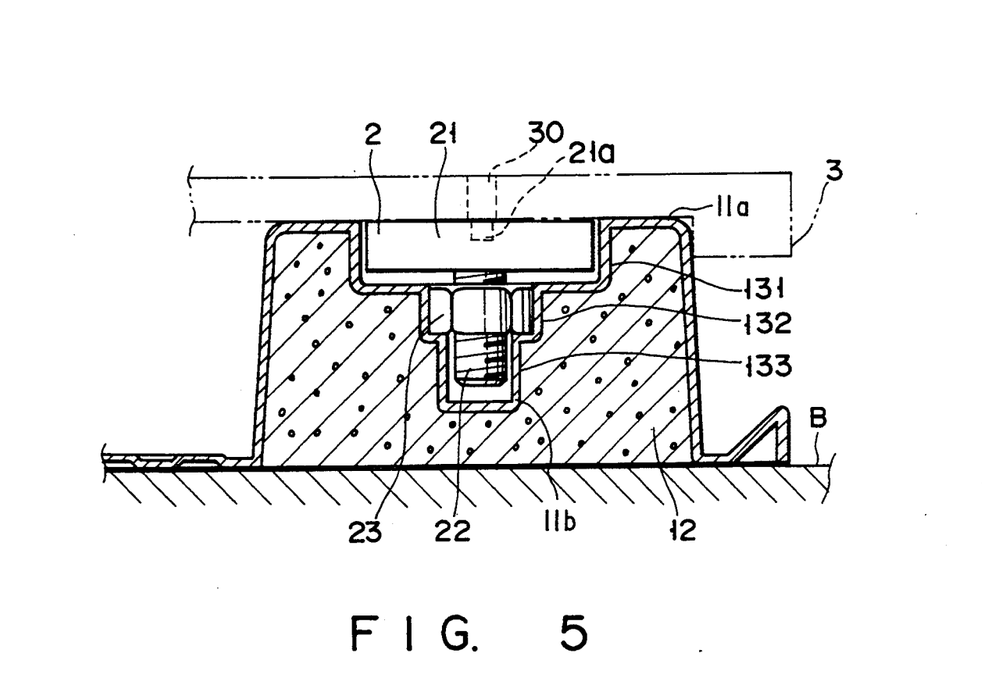
FIG. 5 is a cross sectional view showing an enlarged structure of the prop portion shown in FIGS. 1 to 3.
Figure 6:
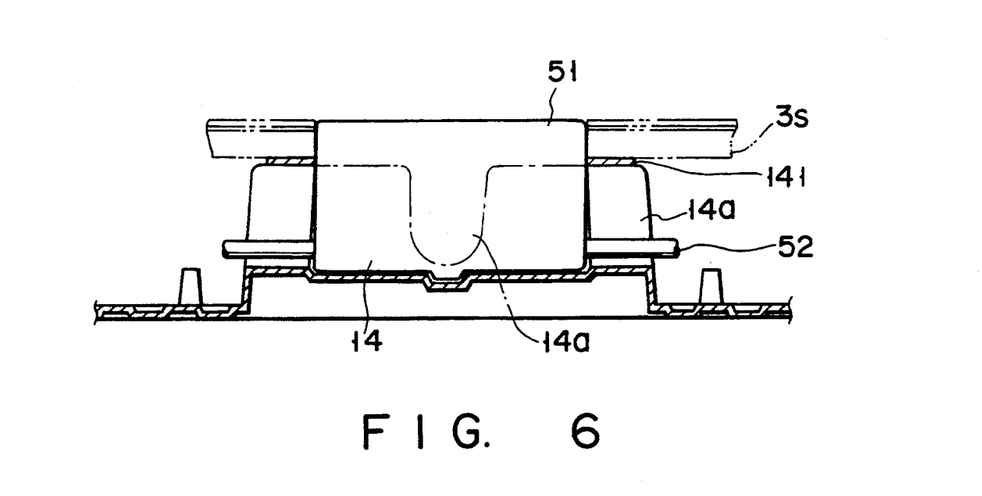
FIG. 6 is a cross sectional view showing a state that an electrical part is attached to a central prop (auxiliary prop) shown in FIGS. 1 to 2.
Figure 7A:
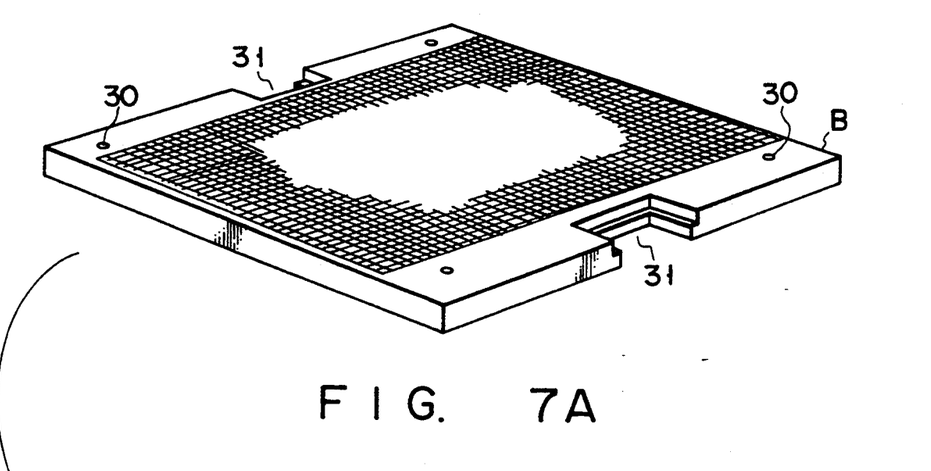
FIGS. 7A and 7B are perspective views showing the structure of the floor panel shown in FIG. 1.
Figure 7B:
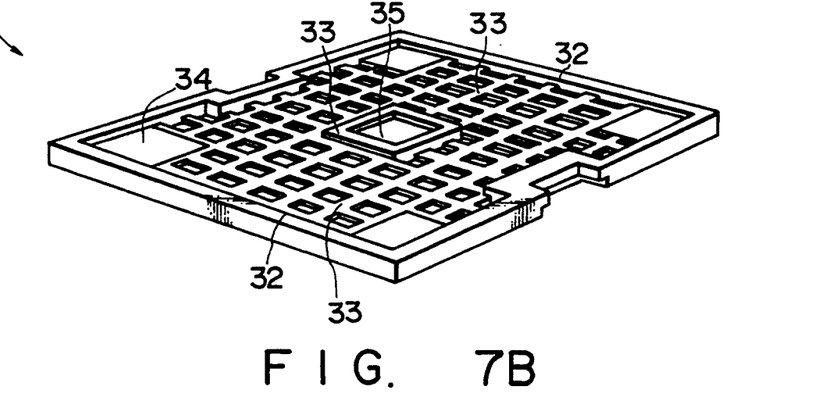

FIGS. 1 through 6 show one embodiment of the present invention. FIG. 1 is an exploded perspective view showing the entire structure of a floor panel. FIG. 2 is a plane view showing the floor base. FIG. 3 is a cross sectional view of an upside skin without concrete taken along the line A—A of FIG. 2. FIG. 5 is a cross sectional view showing the enlarged structure of a prop portion of a corner shown in FIGS. 1 and 2. FIG. 6 is a cross sectional view showing a state that an electrical part is attached to a central prop (auxiliary prop) shown in FIGS. 1 to 2. FIGS. 7A and 7B are perspective views showing the structure of the floor panel shown in FIG. 1.

In FIGS. 1 through 6, reference numeral 1 is a floor base formed on a surface B of a base floor. Reference numeral 11 is a skin, which is a structural element of the floor base 1 and made of a rectangular synthetic resin sheet and formed by a press molding process. In the skin 11, there are integrally formed by press molding, props 13, 13, . . . , 14 having convex portions 11a, 11a, . . . , 11c projecting to the upper surface side in the four corners and the central portion. Viewed from the underside of the skin, there are concave portions 11b, 11b, . . . , 11d also formed by the press molding process.

In the skin 11, concrete 12 is packed into each of the concave portions 11b, 11b, . . . , 11d when the openings of the concave portions 11b, 11b, . . . , 11d are directed upward as illustrated in FIG. 5. The concrete is hardened, thereby forming a central auxiliary prop 14 whose height is slightly lower than the props 13, 13, . . . formed at the four corners. The concrete 12 which is packed into the concave portions 11b, 11b, . . . , 11d, can be ultra-high-strength special light-weight concrete, which is formed of high strength inorganic material having a composition containing cement, silica, a special addition agent with thermosetting melamine resin. The concrete 12 which is packed in each of the concave portions 11b, 11b, . . . , 11d is hardened by applying vibration to the skin 11.

Figure 4:
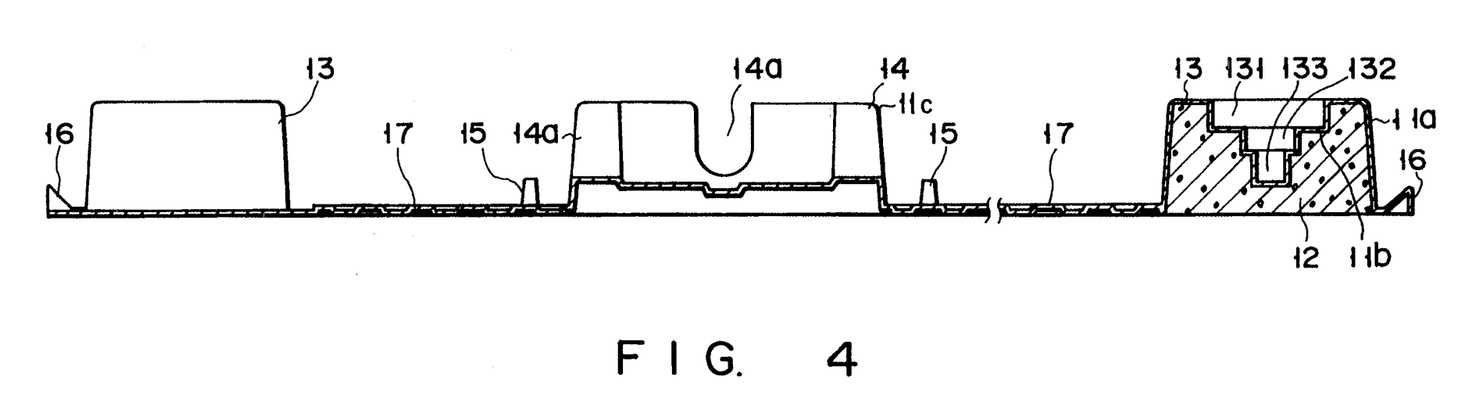
FIG. 4 is a cross sectional view of a skin in a right-side-up position containing props 13 and auxiliary prop 14 after concrete has been added to the skin of the FIG. 3.

Thereby, as shown in FIG. 4, there can be generated the floor base 1 having the props 13, 13, . . . , with high strength at the four corner props 13 and center auxiliary prop 14 in which concrete 12 having an extremely high compression is packed as reinforcing material.

On the upper surface of the skin 11, there are two hooking projections 15 for a horizontal separator 5 formed at each side around the auxiliary prop 14 and spaced from an outer wall surface of the auxiliary prop 14. On an edge portion of each side of the floor base 1, there are formed two butting projections 16 for preventing the overlap of neighboring floor bases. Further, on the upper surface of the skin 11, there are projection line portions 17 (see FIG. 2) having a drain hole 17a in both end portions in a longitudinal direction. In each of the corner props 13, 13, . . . , of the floor base 1, there is an adjusting screw 2, having a plate, for adjusting the height, as illustrated in FIG. 5. More specifically, on the upper portion of the convex portion of each corner prop, there is a storing hole 131 for a base seat portion 21 of the adjusting screw 2 having a plate, a hole 132 for a nut 23 which is screwed to a bolt 22 of the adjusting screw 2, and a relief hole 133 for the bolt 22. The adjusting screw 2 with the plate, comprise the base seat portion 21, the bolt 22, and the nut screwed to the bolt 22, are stored in the concave portion having these holes 131, 132, and 133. An angular hole 21a (e.g., a hexagonal hole) for engaging with a hexagonal wrench (not illustrated) is formed in the central portion of the upper portion of the base seat portion 21 of the adjusting screw 2 with the plate. The hexagonal wrench is inserted into the angular hole 21a through a wrench through hole 30 formed in each of the four corners of the floor panel 3, thereby making it possible to easily adjust the height of each of the props 13, 13, . . . from the upper surface of the floor panel 3. This allows adjustment of an unsteady state (e.g. rocking) of the floor panel 3 and the height of the floor panel 3. A U-shape groove 14a (see FIG. 6) is formed in each side of the auxiliary prop 14. Then, as shown in FIG. 6, if an electrical part 51 such as a power plug socket, a distributor, a connector, a receiver, a transmitter, and the like is embedded in the auxiliary prop 14, the groove 14a is used as an outlet or inlet for a cable 52. The shock absorbing member is illustrated in FIG. 6 as reference numeral 141.

Turning now to FIGS. 7A and 7B for a description of the floor panel 3, there are rectangular opening portions 31 formed in the opposing sides thereof. Also, main ribs 32 having a constant width are formed in the peripheral portion of the lower surface, and auxiliary ribs 33 are formed in a face portion other than the main ribs 32. Moreover, in the under side of the floor panel 3, prop connecting portions 34 and 35 are formed by the main and auxiliary ribs 32 and 33. The prop connecting portions engage with the respective props 13, 13, ..., 14 formed in the floor base 1 through a shock absorbing member. At the time of construction, the respective props 13, 13, ..., 14 are engaged with the prop connection portions 34 and 35 formed by the respective ribs 32 and 33, and the floor panel 3 is fixed at a constant position on the floor base 1. In this case, when a large load is not applied to the floor panel 3, a load, which is applied to the shock absorbing member between the auxiliary prop 14 formed in the central portion on the floor base 1 and the prop connecting portion 35 formed in the central portion of the lower surface of the floor base 3, is considerably small. The prop connecting portions 34 and 35 or the thickness of the shock absorbing member are adjusted such that when a large load is applied to the base panel 3, the auxiliary prop 14 of the central portion functions to support a part of the load. Moreover, as shown in FIG. 6, if the electrical part 51 such as the power plug socket, the distributor, the connector, the receiver, the transmitter, and the like is embedded in the auxiliary prop 14, there is used a floor panel 3s in which a hole is formed, in advance, in the prop connecting portion 35 to correspond to the auxiliary prop 14 of the back surface of the panel, as shown in FIG. 7B.

A connection piece 4, illustrated in FIG. 1, has an insertion hole to which the props 13 of the corner portions are inserted. The connection piece is inserted into the props 13, 13, ... of the corners when adjacent floor bases 1, 1, ... are mutually connected.

A horizontal separator 5 forms a wiring layer. The separator 5 is hooked on the two hook projection portions 15 and 15 formed on each side of the auxiliary prop 14 on the floor base 1. The separator 5 is supported at an arbitrary space above the floor base 1 and divides the space into upper and lower portions. In this case, a hinge portion is formed on the upper side of the hook portion to be opened upward. Normally, the horizontal separator 5 is secured to a fixed position where the space between the floor base 1 and the floor panel 3 is divided into two by a leg portion formed on both sides of the hook portions.

As mentioned above, concrete 12 is poured into the concave portions 11b, 11b, ..., 11d of the skin 11, and hardened for a short period of time by applying vibration to the skin 11. By this simple and easy manufacturing method, there can be efficiently manufactured the floor base 1 integrally having strong props 13, 13, ..., 14. Moreover, in the above-mentioned floor base 1, since the skin 11 having the rectangular synthetic resin sheet can be formed on the main body (base) and strong props 13, 13, ..., 14 can be integrally formed, the floor base can be manufactured at a low cost by the simple manufacturing method and the structure has a small number of parts.

The construction work of the above-structured system floor will be carried out as follows:

First, the floor bases 1, 1, ... are sequentially juxtaposed on the base floor surface B such that their ends are arranged in order. Then, the connection pieces 4 are inserted into the props 2, 2, ... of the corners, of the juxtaposed floor bases 1, 1, ..., thereby coupling the floor bases to each other. Thereafter, the horizontal separator 5 is hooked to the arbitrary hook projection portions 15, 15 on the floor base 1, and a predetermined wiring passage, a duct and the like are formed, and a predetermined wiring process is carried out, Thereafter, the floor panels 3, 3, ... are mounted on the floor bases 1, 1, .... In this case, the floor panels are supported on the props 13 of four corners, which are formed on the floor bases 1, and the central auxiliary prop 14 through the shock absorbing material, Moreover, the props 13 of four corners are engaged with the prop connection portions 34 of the floor panel 3 and the central auxiliary prop 14 is engaged with the prop connection portion 35, thereby securing the floor panel 3 to a fixed position on the floor base 1. In this case, a load to be applied to the floor panel 3 is dispersed and the dispersed load is applied to the props 13 serving as main props, and the prop 14 serves as an auxiliary prop. In a state that a large load is not applied to the floor panel 3, a load which is applied to the shock absorbing member between the auxiliary prop 14 and the prop connecting portion 35 is considerably small. When a large load is applied to the floor panel 3, the auxiliary prop 14 of the central portion functions to support a part of the load.

Moreover, in a case where the power plug, the distributor, and the connector are formed on the floor in a state that the floor mat is spread on the upper surface of the floor panel 3, these arbitrary electrical parts 51 are embedded in the auxiliary prop 14, and the cable 52 is formed through the groove 14a formed in the wall portion of the auxiliary prop 14, as shown in FIG. 6. Thereby, the various types of electrical parts 51 can be easily provided in the surface of the floor. In this case, in accordance with the type of the electrical parts 51, there is used a floor panel 3s in which a hole is formed in the prop connecting portion 35 to correspond to the auxiliary prop 14 of the back surface of the panel shown in FIG. 7B.

The adjustments and stableness of flatness of the floor panel 3 after the floor panel 3 is set on the floor base are performed as follows.

The hexagonal wrench is inserted into one of wrench-through holes 30 formed in the four corners of the floor panel 3. The top end of the wrench is engaged with the angular hole 21a, which is formed in the central portion of the upper portion of the base seat portion 21 of the adjusting screw 2 with plate. Then, the adjusting screw is rotated, thereby adjusting the height of the floor panel 3 after the floor panel 3 is in place.

The construction of the system floor (multifunctional system floor) is completed through the above-mentioned working.

In the above-structured system floor shown in the embodiment, the skin 11 formed of the rectangular synthetic resin sheet is formed in the main body (base) and strong props 13, 13, ..., 14 can be integrally formed. The floor base 1 can be manufactured by the simple manufacturing processes and the floor base 1 can be easily manufactured by the small number of parts. Thereby, the system floor having high reliability can be provided with low cost. Moreover, the main rib 32 and the auxiliary rib 33, which are formed in the lower portion of the floor panel 3, are respectively engaged with the props 13 and 14 of the corner portions and the central portion, which are formed on the floor base 1. Then, the floor panel 3 is supported at the constant position on the floor base 1. Due to this, by the simple structure having the ribs 32 and 33 serving as the reinforcing members for the floor panel 3, the floor panel 3 can be secured to the fixed position on the floor base and supported. Also, the weight of the floor panel can be lightened and the cost thereof can be reduced. Moreover, the floor structure can be simplified and easily and quickly constructed. Furthermore, the floor structure has high durability to fully withstand the large load.

According to the above-mentioned embodiment, the floor panel 3 is supported at the fixed position on the floor base 1 by the props 13 of the corners and the auxiliary prop 14 of the central portion, which are formed on the floor base 1. Moreover, the auxiliary prop 14 of the central portion functions when the large load is applied to the floor panel 3. Due to this, by use of the structure having the minimum number of props, there can be realized the system floor having high durability to fully withstand the large load, and excellent conformability.

Figure 8:
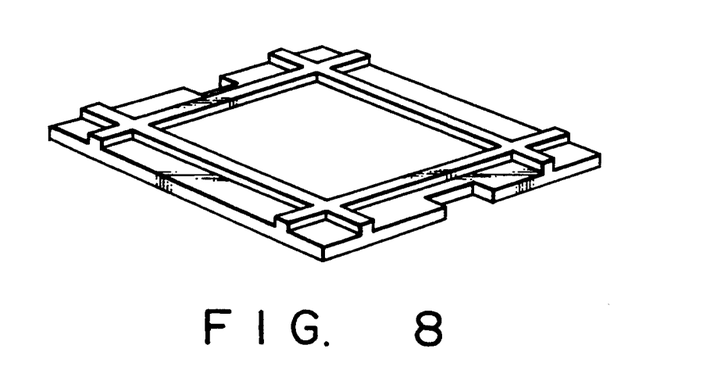
FIG. 8 is a perspective view showing a rib structure of the floor panel in the other embodiment of the system floor of the present invention.

FIG. 8 shows the rib structure of the floor panel according to the other embodiment. This embodiment shows the floor panel structure having ribs, which are shaped in parallel crosses, and which are parallel with each side. The props 13 of the corners are engaged with two sides of the rib, and the floor panel is supported at the fixed position on the floor base 1.

In the above embodiment, the floor panel 3 is supported by five props 13 and 14 formed on the floor base 1. However, it is possible to support the floor panel 3 by four props 13 of the corners. Moreover, according to the above embodiment, the respective convex portions 11a and 11c, which are integrally project to the upper surface side, are formed in the four corners of the skin 11 and the central portion. The concave portions 11b and 11d are formed in the lower surface side, and ultra-high-strength special light-weight concrete 12 is packed therein, thereby forming the central auxiliary prop 14, which is slightly lower than the props 13 of the four corners, and integrated into the skin 11. However, it is possible to pack hardening material such as the other concrete material in the concave portions 11b and 11d. Moreover, the structure of the floor base and that of the floor panel are not limited to the above-mentioned structure, and the other sheet-like material may be used.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A system floor, comprising:
   a rectangular floor base having four corners and having a convex prop, integral to said base, at each of said corners, each of said convex props having a concave portion on an upper surface thereof, each of said props further having a support position;
   a height adjusting means, embedded in the concave portion of each of said props, for variably adjusting a height of the support position of each of said props within a predetermined range between a position lower than the upper surface of a respective one of said props and a position higher than the upper surface of the respective one of said props; and
   a floor panel, having four corners, supported by each of said props at the support positions of said props, and having a through hole at each of said corners of said floor panel through which the height adjusting means is accessed to adjust the support positions of said props.

2. A system floor, comprising:
   a rectangular floor base having four corners and having a convex prop, integral to said base, at each of said corners and at a central portion thereof, each of said props having a concave portion on an upper surface of said props, each of said props further having a support position;
   a height adjusting part, embedded in said concave portion of each of said props at the corners of the base, for variably adjusting a height of the support position of each of said props at the corners of the base within a predetermined range between a position lower than the upper surface of the prop and a position higher than the upper surface of the prop;
   an electrical part embedded in said concave portion of said prop at said central portion; and
   a floor panel which has four corners and is supported by each of said props, said floor panel having a through hole at each of said corners through which the height adjusted part of each of said corners is accessed to adjust the support positions of said props, said floor panel further having a hole portion through which the electrical part is accessed.

3. The system floor according to claim 1, wherein each of said height adjusting means comprises;
   a nut embedded in the concave portions, and a bolt with a seat screwed to said nut.

4. The system floor according to claim 2, wherein each of said height adjusting means comprises;
   a nut embedded in the concave portions, and a bolt with a seat screwed to said nut.

5. A system floor, comprising:
   a floor base having integral convex portion projecting upwardly on at least four corners of a rectangular synthetic resin sheet serving as a skin, a first concave portion being formed on an upper surface of each of said convex portions and a second concave portion being formed on a lower surface of each of said convex portions, concrete being packed and hardened in each of said second concave portions, at least four props being formed on said floor base by said integral convex portions, said first concave portions and said second concave portions which are integral with said skin, and a height adjusting part for variably adjusting a height of each of said at least four props being inserted in each of said first concave portions; and
   a floor panel engaged with said at least four prop of said floor base and supported thereby.

6. A system floor, comprising:
   a floor base having integral convex portions projecting upwardly on at least four corners and at a central portion of a rectangular synthetic resin sheet serving as a skin, a first concave portion being formed on an upper surface of each of said convex portions and a second concave portion being formed on a lower surface of each of said convex portions, concrete being packed and hardened in each of said second concave portions, at least five props being formed on said floor base by said integral convex portions, said first concave portions and said second concave portions which are integral with said skin, and a height adjusting part for variably adjusting a height of each of said at least five props being inserted in each of said first concave portions formed in each convex portions on the at least four corners; and a floor panel engaged with each of said at least five props of said floor base and supported thereby.

7. The system floor according to claim 5, wherein each of at least four said props comprises:

a nut embodying concave portion projecting into said first concave portion in an upper portion of the convex portion; and each of said height adjusting parts comprises:

a nut embodied in said nut embodying concave portion; and a height adjusting bolt which adjusts a height of the floor panel screwed into the nut.

8. The system floor according to claim 6, wherein each of said props at said corners comprises;

a nut embodying concave portion projecting into said first concave portion in upper portions of the convex portions; and each of said height adjusting parts comprises:

a nut embodied in said nut embodying concave portion; and a height adjusting bolt which adjusts a height of the floor panel screwed into the nut.

9. The system floor according to claim 1, wherein said floor base further comprises:

a butting projection at an edge portion thereof, for preventing an overlap of an adjacent floor base.

10. The system floor according to claim 2, wherein said floor base further comprises:

a butting projection at an edge portion thereof, for preventing an overlap of an adjacent floor base.

11. The system floor according to claim 5, wherein said floor base further comprises:

a butting projection at an edge portion thereof, for preventing an overlap of an adjacent floor base.

12. The system floor according to claim 6, wherein said floor base further comprises:

a butting projection at an edge portion thereof, for preventing an overlaps of an adjacent floor base.

13. A method for constructing a system floor, comprising the steps of:

forming props which are integral with a base of a skin formed of a rectangular resin sheet by forming convex portions on at least four corners of the base of the skin formed of the rectangular synthetic resin sheet, forming a first concave portion on an upper surface of each of said convex portions, and forming a second concave portion in a lower surface of each of said convex portions;

strengthening said props by placing the base such that said second concave portions face upwardly, and packing and hardening concrete in each of said second concave portions; and arranging said base such that said first concave portions face upwardly and said second concave portions face downwardly, inserting a height adjusting part in each of said first concave portions which are facing upwardly, and placing a panel on said height adjusting parts.

* * * * *